United States Patent
Mese et al.

(10) Patent No.: US 10,831,440 B2
(45) Date of Patent: Nov. 10, 2020

(54) COORDINATING INPUT ON MULTIPLE LOCAL DEVICES

(71) Applicant: Lenovo (Singapore) Pte. Ltd., Singapore (SG)

(72) Inventors: John Carl Mese, Cary, NC (US); Nathan J. Peterson, Oxford, NC (US); Arnold S. Weksler, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 158 days.

(21) Appl. No.: 15/276,085

(22) Filed: Sep. 26, 2016

(65) Prior Publication Data

US 2018/0088902 A1  Mar. 29, 2018

(51) Int. Cl.
  *G06F 3/16*  (2006.01)
  *G10L 15/22*  (2006.01)
  *G06F 3/14*  (2006.01)

(52) U.S. Cl.
  CPC .............. *G06F 3/167* (2013.01); *G10L 15/22* (2013.01); *G06F 3/1454* (2013.01); *G10L 2015/223* (2013.01)

(58) Field of Classification Search
  CPC ....... G06F 3/167; G06F 3/1454; G10L 15/22; G10L 2015/223
  See application file for complete search history.

(56) References Cited

U.S. PATENT DOCUMENTS

| | | | |
|---|---|---|---|
| 5,983,186 A * | 11/1999 | Miyazawa | G10L 15/26 704/233 |
| 9,317,413 B2 * | 4/2016 | Lin | G06F 11/3688 |
| 9,509,944 B2 * | 11/2016 | Micewicz | H04N 21/4524 |
| 9,668,052 B2 * | 5/2017 | Lombardi | H04L 12/2838 |
| 9,965,247 B2 * | 5/2018 | Jarvis | G10L 15/222 |
| 10,038,790 B2 * | 7/2018 | Baek | H04M 3/543 |
| 10,152,969 B2 * | 12/2018 | Reilly | G10L 15/02 |
| 10,257,363 B2 * | 4/2019 | Mese | H04W 4/80 |
| 10,297,256 B2 * | 5/2019 | Reilly | G10L 15/22 |
| 10,685,669 B1 * | 6/2020 | Lan | G10L 25/51 |
| 10,692,518 B2 * | 6/2020 | Sereshki | G10L 21/0232 |
| 2015/0086034 A1 * | 3/2015 | Lombardi | G06F 3/165 381/81 |
| 2015/0135169 A1 * | 5/2015 | Lin | G06F 11/3692 717/131 |
| 2015/0310788 A1 * | 10/2015 | Park | G09G 3/20 345/173 |
| 2015/0350590 A1 * | 12/2015 | Micewicz | H04N 21/4223 386/230 |
| 2016/0078840 A1 * | 3/2016 | Kusaka | G06F 3/1438 345/173 |
| 2016/0127559 A1 * | 5/2016 | Baek | H04M 3/543 455/417 |
| 2018/0018964 A1 * | 1/2018 | Reilly | G10L 15/20 |

(Continued)

*Primary Examiner* — Michael J Jansen, II
(74) *Attorney, Agent, or Firm* — Ference & Associates LLC

(57) ABSTRACT

One embodiment provides a method, including: receiving, at a first device, a user input; activating, from the first device, a second device; and thereafter coordinating, using the processor of the first device, with the second device to process the user input. Other aspects are described and claimed.

12 Claims, 5 Drawing Sheets

(56) References Cited

U.S. PATENT DOCUMENTS

| | | | |
|---|---|---|---|
| 2018/0027127 A1* | 1/2018 | Mese | H04L 67/18 |
| | | | 455/420 |
| 2018/0088902 A1* | 3/2018 | Mese | G10L 15/22 |
| 2019/0108839 A1* | 4/2019 | Reilly | G10L 15/20 |
| 2019/0341045 A1* | 11/2019 | Reilly | G10L 15/34 |

* cited by examiner

COORDINATING INPUT ON MULTIPLE LOCAL DEVICES

BACKGROUND

Electronic devices, e.g., a media player, a smart television, a laptop or tablet computing device, a smart phone, combinations thereof, etc., herein "devices," are capable of responding to user inputs to perform actions, e.g., command actions such as playing media files, performing virtual assistant tasks, etc. Certain devices are capable of processing and responding to user inputs such as voice input, gesture input, or combinations thereof.

Depending on the use context, a user might provide input to more than one device. For example, a user may provide voice input while walking between rooms having devices that respond to voice commands, where each of the devices is capable of detecting some of the voice command. In such situations, the devices would better serve the user if the devices coordinated the collection and processing of the input data.

BRIEF SUMMARY

In summary, one aspect provides a method, comprising: receiving, at a first device, a user input; activating, from the first device, a second device; and thereafter coordinating, using the processor of the first device, with the second device to process the user input.

Another aspect provides an electronic device, comprising: an input device; an output device; a processor operatively coupled to the input device and the output device; and a memory device that stores instructions executable by the processor to: receive a user input; activate, from the electronic device, a second device; and thereafter coordinate with the second device to process the user input.

A further aspect provides a method, comprising: receiving, from a first device, a user input; receiving, from a second device, other user input; combining, using a processor, the user input and the other user input; and coordinating, using the processor, processing of the combined input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
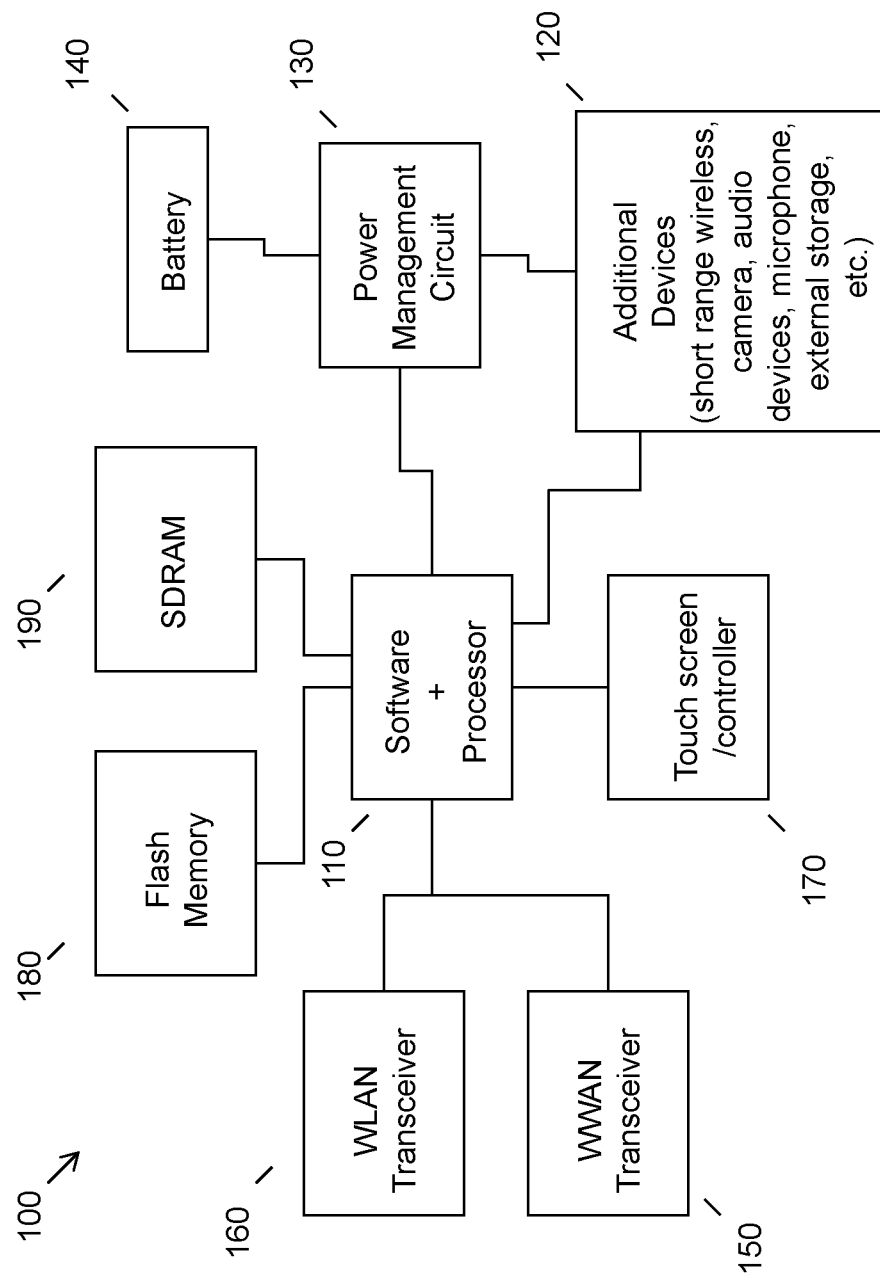
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When more than one device in a smart home environment is capable of receiving input data, it may be difficult to ensure that the entirety of the input data is received. For example, if a home has two devices that respond to voice input, e.g., one in the living room and one in the kitchen, and a user begins to issue voice input from a first location and thereafter continues to issue voice input from a second location, each device may only receive part of the voice input. Rather than have each device respond to a partial voice input, it would be desirable if the devices could coordinate with one another to resolve the total user input, which then might be acted upon.

Accordingly, when a user input such as a voice command is first detected, in an embodiment, the originating device begins processing the user input data. For example, the first or originating device may begin processing user voice input of "prepare a shopping list" to create a shopping list. The processing by the originating device might include calculating a confidence value for the voice input received, resolving a command, e.g., create a shopping list, and initiating the population of the shopping list with various items as they are spoken by the user. As the user moves to a different room, the originating device determines that the user is moving, e.g., based on the direction of the voice input, based on a reduction in volume of the voice input, a detected frequency shift in the voice input (Doppler effect), etc. In this case, the originating device may not detect the tail end of the list, e.g., the last few items spoken by the user may go undetected by the first or originating device or may be received and scored with low confidence.

According to an embodiment, however, the originating device is programmed with the locations of the other user input devices in the smart home, and thus the originating device is capable of coordinating with the other device(s). For example, another device toward which the user is moving may be activated by the originating device, e.g., without requiring the user to provide a wake-up word to activate the second device. This permits the second or target device to activate and continue receiving the voice input in service of performing the ongoing user command, in this example creating a shopping list.

Other mechanisms might be used to activate other devices. For example, the originating device can activate all the other user input devices it is aware of (irrespective of their locations) such that they may be used to collect user input, either proactively or responsive to detecting that the user is moving away from the first device. In a responsive activation case, the originating device might receive voice data from the other device(s) and identify the last voice input (e.g., based on voice pitch, timber, time stamp, etc.) to identify the next device to activate for user input data reception and processing.

The various user input devices therefore may communicate with one another in coordinating the processing of the user input data that has been collected by the distributed network of devices. By coordinating, the devices improve the collection and processing of the user input. For example, when the voice command is complete, one of the devices overlays lower confidence portions to replace them with higher confidence portions in order to resolve a single best user input to which a command response is provided.

Because the devices are coordinating, the device utilized for output also may be chosen, e.g., the device that last received the user input might processes a command and provide a response, the device that is currently proximate to or closest to the user might process a command a provide a response, the device that is most capable of completing the command might process a command, whereas another device might provide a response, etc.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a microphone for receiving voice commands, a camera for receiving image data including gestures, etc. System 100 often includes a touch screen 170 for data input and display/rendering. System 100 also typically includes various memory devices, for example flash memory 180 and SDRAM 190.

Figure 2:
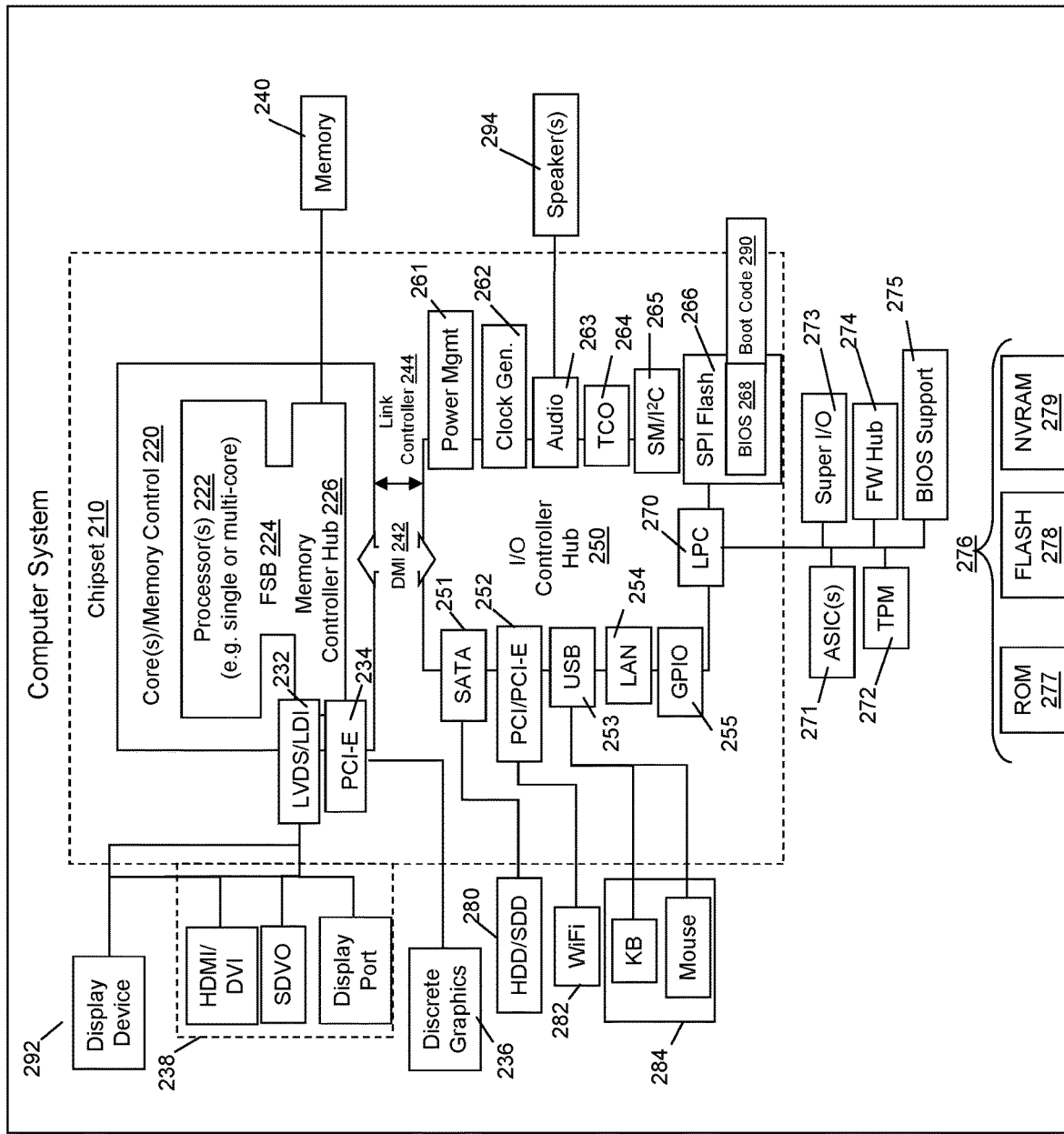
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices found in a smart home environment, such as media players, smart TVs and the like. The circuitry and components used in such devices may vary according to their purpose. For example, a device may include a microphone and speech processing circuit or program in order to receive audible user input and determine a command contained therein. Similarly, another device might include a camera and gesture processing circuit or program in order to receive gesture inputs performed by the user and match the same to command actions.

Figure 3:
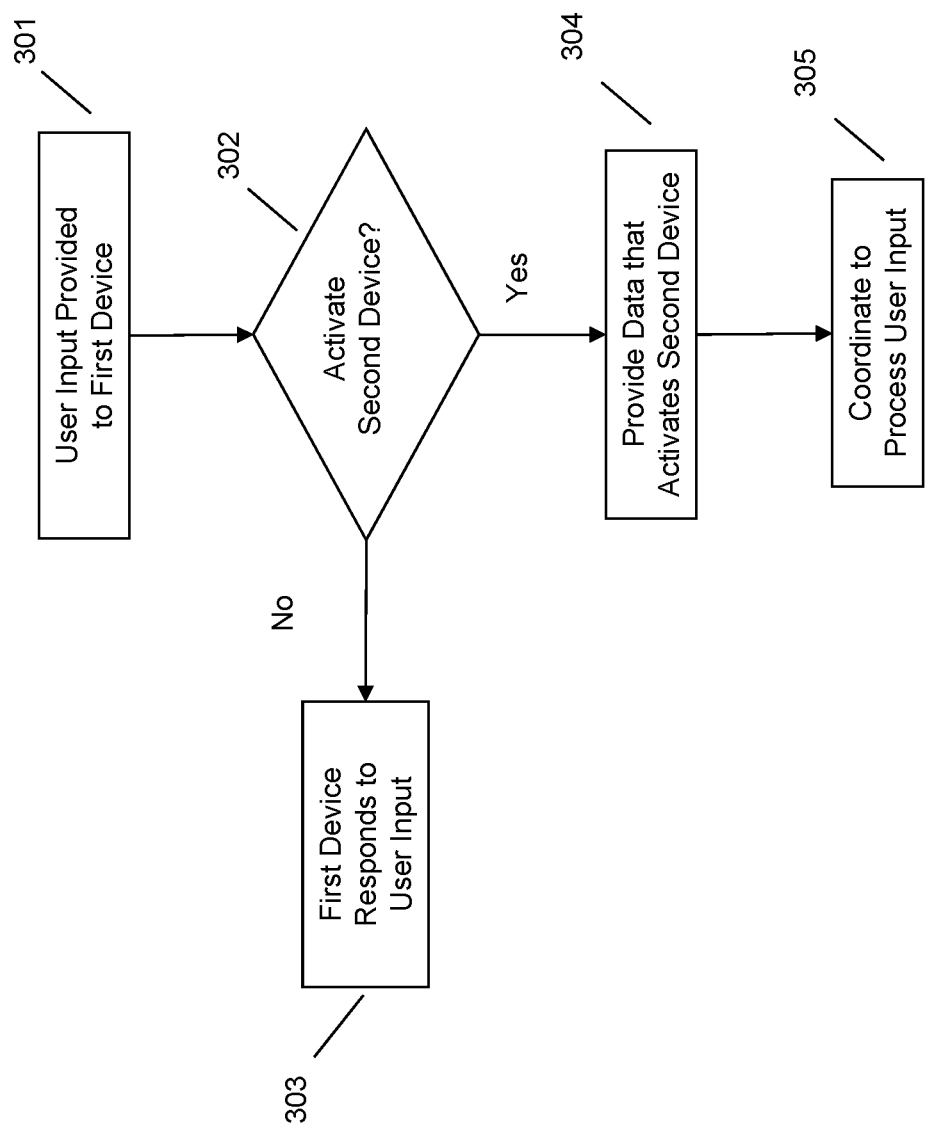
FIG. 3 illustrates an example method of coordinating input in multiple device contexts.

Referring to FIG. 3, a first device of a device pair used in a smart room (refer to FIG. 4(A-B)) receives user input at 301. Conventionally, the first device would simply interpret the user input and execute a given command, e.g., convert user speech input into text and associate the text with a command action. However, this might result in an error message, e.g., where the first device does not receive user input data sufficient to carry out a command or complete a task, such as when a user is moving between devices.

As such, the first device may not immediately act to respond to the user's input. Rather, the first device may determine if a second device is capable of receiving to the user's input at 302. Of course this determination, as with other steps outlined in the figures, may take place in a different order, e.g., before the user input is received. The determination at 302 may be made in a variety of ways, including directly sensing and/or communicating with proximate devices in real time, coordinating communication via a cloud or networked (intermediary) device in real time, preprogramming device activation ahead of time, etc. If the first device is the only device capable of responding to the user's input, as determined at 302, the first device may act to respond thereto, as illustrated at 303.

If the first device determines, e.g., senses, is instructed, etc., that another device is capable of receiving user input, a determination may be made as to whether there is a preference for a particular target device to be activated for receipt of user input. The determination that there is, or is a preference for, a second device to be activated might include determining that one of the other devices is closer to the user, determining that the user is moving towards a particular device, determining that a user is moving away from the first device, etc.

This processing may include analyzing user input data to determine a characteristic of the user input data. For example, user voice data may be analyzed to identify a characteristic such as changing amplitude that indicates a direction characteristic, which in turn indicates that the user is moving away from the first device and towards a particular target device. As may be appreciated, the analysis of user input characteristics may be utilized in deciding to activate a second device generally in addition to choosing among available devices to activate. It will be of course be understood that, by extension, more than one other device might be activated and thus a plurality of devices might be utilized to coordinate receipt and/or processing of the user input.

In any event, if the first or originating device determines, as illustrated at 302, that a second device is capable of being activated to receive user input, e.g., because the second device is in the path of a moving user, the first device may produce data that activates the second device, as illustrated at 304. As an example, the first device might transmit a signal or communication wirelessly to the second device, i.e., the receipt of which activates the second device, similar to a wake up word being provided. The data that activates the second device may also be produced at 304 and thereafter transmitted through a remote or intermediary device, as further described in connection with FIG. 4(A-B).

Having two or more devices activated and receiving the user input, irrespective of the activation mechanism employed to permit the devices to collect or receive user input, the devices may thereafter coordinate the processing of the user input, as illustrated at 305. For example, the first device might receive the first part of a user command, as illustrated at 301, for example, user input provided using voice or gesture input, and thereafter determine that a second device should be activated, as illustrated at 302. This determination at 302 again might be based on a characteristic of the user input, e.g., a directional component derived from analyzing a received voice signal, a received image input, etc. Alternatively, the determination at 302 might be made by default, e.g., at least one second device might be activated each time the first or originating device is activated.

If two or more devices are utilized to receive user input, the devices may thereafter communicate with one another, directly or via an intermediary device, to process the received voice input. For example, the first device, although it recorded some voice signal for a later part of a voice command, might score this data with a low confidence. Thereafter, the first device might query the second device to retrieve higher confidence speech to text data for the later part of the command. The first device may thereafter form a complete command input by substituting the data from the second device for low confidence data that the first device obtained and/or for data that is missing on the first device. As such, the first device may formulate a predetermined action, e.g., a voice response, based on the complete data set. As will be appreciated by those having skill in the art, the second device likewise might be used to form the complete command, or each device might report its data to an intermediary device that then forms the complete command, selects a user device to make the response, execute the task, etc.

Turning now to FIG. 4(A-B), an example is illustrated with reference to a non-limiting use case. The following example highlights some specific example functionality and explains further the general method outlined in FIG. 3.

Figure 4A:
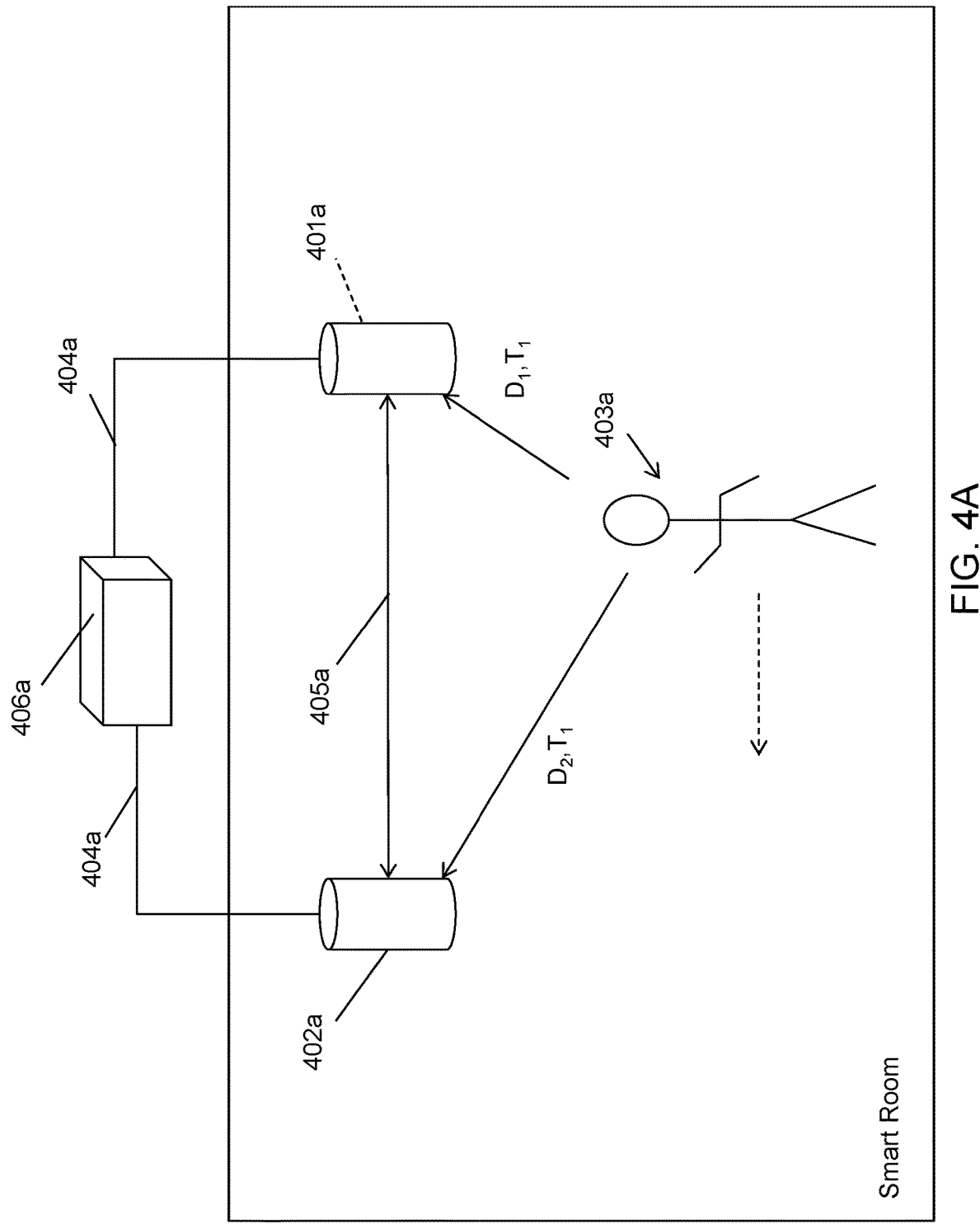
FIG. 4(A-B) illustrates an example use environment.

As shown in FIG. 4A, in a smart room (e.g., kitchen, living room, etc.) having more than one electronic device 401a, 402a capable of receiving user inputs over time, a user 403a may issue a command such as a voice query "prepare a shopping list" at time $T_1$. A first device 401a might hear and act on the voice command, since the user 403a is standing nearest device 401a at time $T_1$. The first device 401a approximates the distance from user 403a to be $D_1$ and stores this information. The second device 402a, if able to hear the user 403a at $T_1$, also approximates the distance from the user 403a (here indicated as $D_2$); however, device 402a does not activate or respond to the voice command.

The devices 401a, 402a may communicate data between themselves and/or to an intermediary device 406a. For example, device 401a may communicate directly with device 402a via wireless communication link 405a, e.g., to activate the second device 402 to receive user input. Furthermore, device 401a may communicate with device 402a via an intermediary device 406a, e.g., via a wired communication link 404a.

Figure 4B:
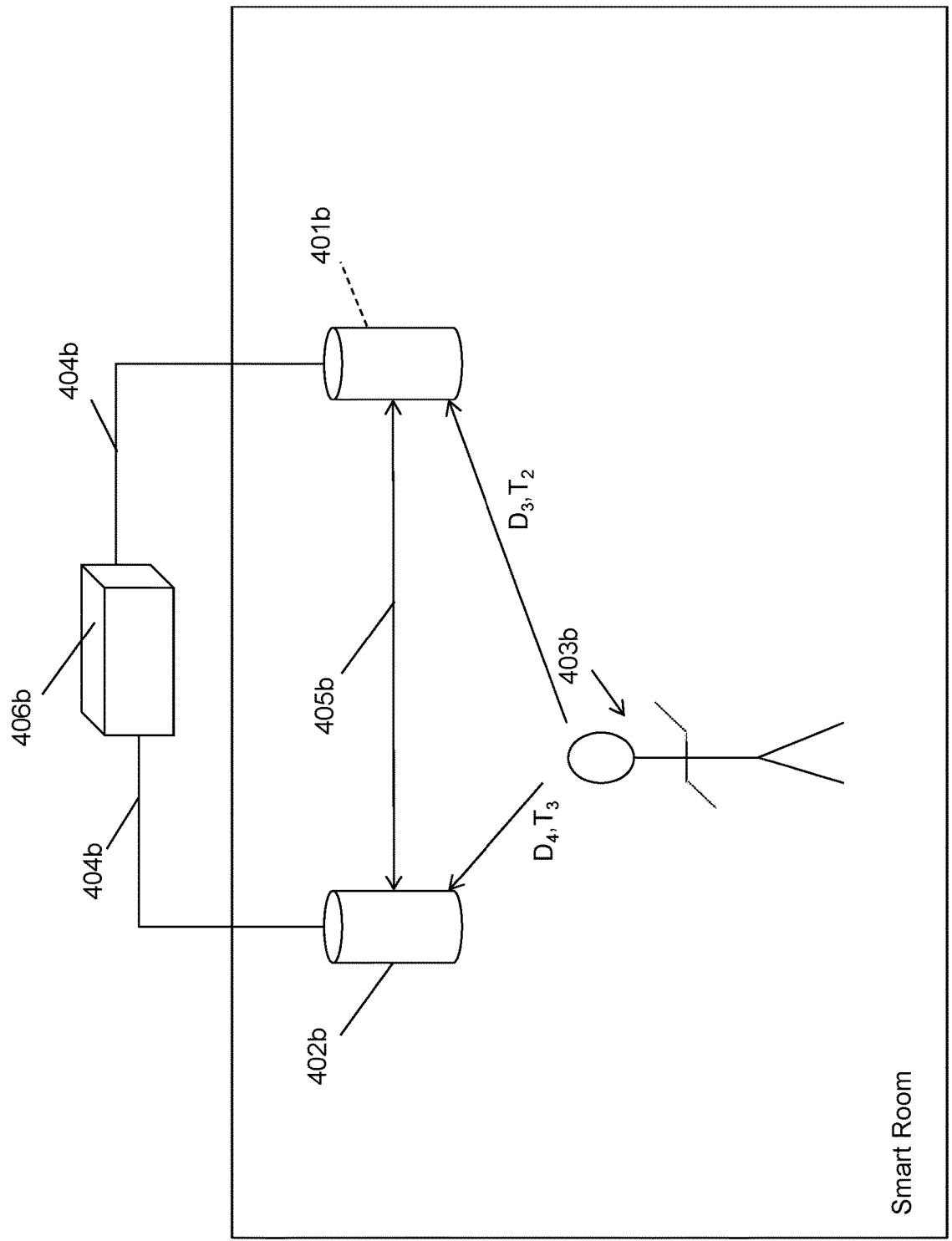

Referring now to FIG. 4B, the user 403b may move away from the first device 401a while continuing to provide voice input. Continuing the example of FIG. 4A, if the first part of the user input provided at time $T_1$ includes "prepare a shopping list" and the user 403b is moving away from device 401b and towards 402b, additional or subsequent user input provided at time $T_2$ might include items that are to be added to the shopping list, e.g., "milk, bread, . . . " However, at (or shortly after) time $T_1$ device 401b might determine a characteristic in the voice data, e.g., amplitude decrease, frequency shift, direction change, etc., that indicates the user 403b is mobile, the user 403b is moving away from device 401b, the user 403b is moving towards device 402b, etc. Device 401b then, at time $T_2$, communicates with device 402b to provide data that activates device 402b. For example, device 401b may communicate directly via communication link 405b or indirectly via communication link 404b with device 402b.

Device 402b thereafter, e.g., at time $T_3$, begins receiving and processing voice data. Devices 401b and 402b record time(s) and distance(s) associated with the received user inputs, e.g., voice inputs. Thus, device 401b records that at time $T_2$ a user input comprises a characteristic that triggers activation of one or more other devices, e.g., device 402b. A distance metric that is recorded, e.g., $D_3$, may be used to compare to prior voice inputs received by device 401b, e.g., $D_1$, to determine that the user 403b has moved away from device 401b and towards device 402b. This may be useful in selecting another device to activate. Likewise, device 402b records times, e.g., Times $T_1$, $T_3$ and distances, e.g., $D_2$, $D_4$, to likewise resolve the relative location of the user 403b.

It will be noted that device 401b and device 402b may be programmed to be aware of each other's presence, location and/or capabilities, e.g., in terms of distance separating the devices. This may be accomplished via a direct communication link 405 between the devices 401b, 402b locally, e.g., using a BLUETOOTH connection or other wireless communication mechanism. Additionally or in the alternative, the devices 401b, 402b might coordinate their communications in terms of communicating their distance to the user 403b, their confidence in the identification of the user input, etc., via a remote service, e.g., via a connections 404b to a cloud intermediary device 406b. For example, each device 401b, 402b might report its data in terms of distance and confidence in identifying the user input to the cloud device 406b, where the cloud device 406b instructs the devices 401b, 402b as to which device should be activated, how each device should piece together the user inputs, and which device is to respond in a given context.

For example, a user 403a may add several items to their shopping list while walking between devices or between rooms having devices. The first device, e.g., device 401a, starts adding items to the shopping list, detecting that the user 403a is moving from the living room to the kitchen. By the time that the user 403b has moved positions, e.g., as illustrated in FIG. 4B, the last few items that the user speaks and wants to be added to the list may not have been resolved with high confidence by device 401b. The first device 401b therefore may activate a second device, e.g., device 402b, in order to continue to receive the voice input as the user 403b moves along. When the user 403b stops speaking, the received voice input across both devices 401b, 402b is consolidated, e.g., to replace low confidence or missing user input with high confidence input. In an embodiment, the device that actually processes the command and/or responds may be selected, e.g., on the basis of proximity to the user 403b, device capabilities, etc.

Therefore, an embodiment represents a technical improvement in input reception and processing via use of a network of devices. The devices coordinate to receive and process user input data such that a high confidence data set may be acted on, e.g., by a virtual assistant application.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a first device, a user input comprising a voice input providing a command to execute an action in response to the voice input, wherein a first portion of the received user input is associated with a low confidence value;
   activating, due to the low confidence value determined at the first device and from the first device, a second device,
   wherein the activation of the second device is based upon a determination that the second device is capable of receiving the user input according to a proximity of a user to the second device,
   wherein activating the second device comprises transmitting, from the first device, an activation signal to the second device,
   wherein, upon activation of the second device, receiving, a second portion of the user input comprising a second voice input whereby both first and second device receive, user input; and
   thereafter coordinating, using a processor of the first device, the first device with the second device to process the first and second portions of the user input and execute the action based upon the user input received at the first device and additional user input received at the second device,
   wherein the additional user input is received at the second device subsequent to the activation of the second device by the first device.

2. The method of claim 1, wherein the user input data received from the second device is used in place of user input data collected by the first device.

3. The method of claim 1, wherein the coordinating comprises sending the user input data to the second device.

4. The method of claim 1, wherein the coordinating comprises sending the user input data to an intermediary device.

5. The method of claim 1, wherein the data that activates the second device is sent to an intermediary device.

6. The method of claim 1, wherein the data that activates the second device comprises data that activates a group of devices.

7. An electronic device, comprising:
   a processor operatively coupled to the electronic device; and
   a memory device that stores instructions executable by the processor to:
   receive, at the electronic device, a user input comprising a voice input providing a command to execute an action in response to the voice input, wherein a portion of the received voice input is associated with a low confidence value;
   activate, due to the low confidence value determined at the electronic device and from the electronic device, a second electronic device,
   wherein determining to activate the second electronic is based upon a determination that the second electronic device is capable of receiving user input according to a proximity of a user to the second electronic device,
   wherein the second electronic device describes one of a plurality of devices capable of receiving user input,
   wherein activating the second electronic device comprises transmitting, from the electronic device, an activation signal to the second electronic device,
   wherein, upon activation of the second electronic device, receiving, a second portion of the user input comprising a second voice input whereby both first and second electronic device receive user input; and
   thereafter, the electronic device coordinates with the second electronic device to process the user input and execute the action based upon the user input received at the first electronic device and the additional user input received at the second device, wherein the additional user input is received at the second electronic device subsequent to the activation of the second electronic device by the electronic device.

8. The electronic device of claim 7, wherein the user input data received from the second electronic device is used in place of user input data collected by the electronic device.

9. The electronic device of claim 7, wherein the coordinating comprises sending the user input data to the second electronic device.

10. The electronic device of claim 7, wherein the coordinating comprises sending the user input data to an intermediary device.

11. The electronic device of claim 7, wherein the data that activates the second electronic device is sent to an intermediary device.

12. A method, comprising:
    receiving, from a first device, a user input comprising a voice input providing a command to execute an action in response to the voice input;
    receiving, from a second device, additional user input,
    wherein the second device is activated by the first device due to a low confidence value associated with the voice input received from the first device, and
    wherein determining to activate the second device is based upon proximity of a user input to the second device,
    wherein activating comprises transmitting, from the first device, an activation signal to the second device,
    wherein, upon activation of the second device, both the first and second device receive user input;
    combining, using a processor, the user input and the additional user input;
    coordinating, using the processor, processing of the combined input using the user input received at the first device and the additional user input received at the second device,
    wherein the additional user input is received at the second device subsequent to the activation of the second device by the first device; and
    executing the action at one of: the first device and the second device.

* * * * *